(12) United States Patent
Holness

(10) Patent No.: US 10,277,493 B2
(45) Date of Patent: Apr. 30, 2019

(54) PACKET THROUGHPUT AND LOSS RATIO MEASUREMENTS OF A SERVICE FUNCTION CHAIN

(71) Applicant: Ciena Corporation, Hanover, MD (US)

(72) Inventor: Marc Holness, Ottawa (CA)

(73) Assignee: Ciena Corporation, Hanover, MD (US)

( * ) Notice: Subject to any disclaimer, the term of this patent is extended or adjusted under 35 U.S.C. 154(b) by 95 days.

(21) Appl. No.: 15/593,882

(22) Filed: May 12, 2017

(65) Prior Publication Data

US 2018/0331931 A1 Nov. 15, 2018

(51) Int. Cl.
*H04L 12/26* (2006.01)
*H04L 29/08* (2006.01)
*H04L 29/06* (2006.01)

(52) U.S. Cl.
CPC ...... *H04L 43/0888* (2013.01); *H04L 43/0829* (2013.01); *H04L 43/106* (2013.01); *H04L 69/22* (2013.01); *H04L 69/324* (2013.01)

(58) Field of Classification Search
CPC ............. H04L 43/0888; H04L 43/0829; H04L 43/106; H04L 69/22; H04L 69/324
See application file for complete search history.

(56) References Cited

U.S. PATENT DOCUMENTS

| | | | | |
|---|---|---|---|---|
| 2011/0096676 A1* | 4/2011 | Krzanowski | ........ | H04L 12/4641 370/252 |
| 2011/0188380 A1* | 8/2011 | Song | ................... | H04L 43/0829 370/241.1 |
| 2012/0082163 A1* | 4/2012 | Esteve Rothenberg | ..................... | H04L 45/00 370/392 |
| 2013/0223274 A1* | 8/2013 | Cociglio | ................. | H04L 43/00 370/253 |
| 2017/0299633 A1* | 10/2017 | Pietrowicz | .......... | H04L 63/0227 |
| 2017/0311171 A1* | 10/2017 | Kurian | .................. | H04W 16/14 |

OTHER PUBLICATIONS

Anil Kumar S N et al., "Packet Loss Measurement for SFC", Jun. 28, 2016 (18 pages).

* cited by examiner

*Primary Examiner* — Walter J Divito
*Assistant Examiner* — Anthony Luo
(74) *Attorney, Agent, or Firm* — Clements Bernard Walker PLLC; Christopher L. Bernard; Lawrence A. Baratta, Jr.

(57) ABSTRACT

A method for monitoring a network includes generating a first receiving sequence number representing a first location within a first ordered sequence of a number of data packets as received by a receiving device, and extracting a first transmission sequence number representing a second location within a second ordered sequence of the number of data packets as transmitted by a transmitting device. The method further includes generating a second receiving sequence number representing a third location within the first ordered sequence of the number of data packets, extracting a second transmission sequence number representing a fourth location within the second ordered sequence of the number of data packets. The method further includes generating a measurement of network transmission based at least on the first receiving sequence number, the first transmission sequence number, the second receiving sequence number, and the second transmission sequence number.

20 Claims, 5 Drawing Sheets

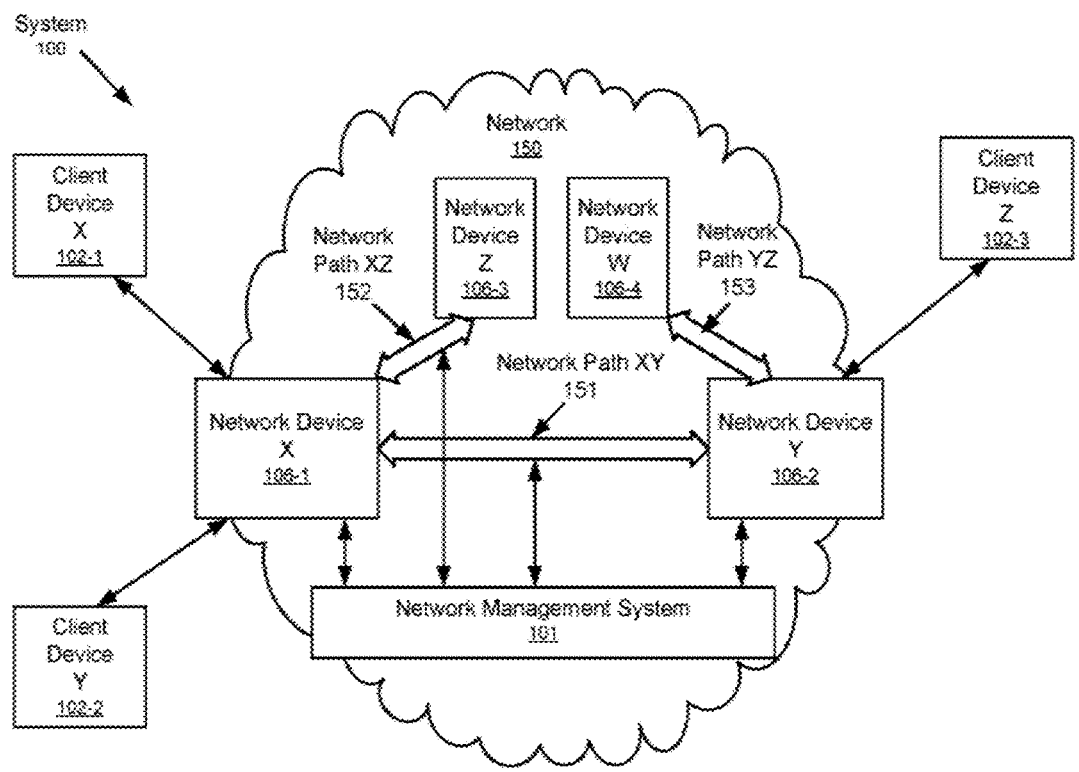
FIG. 1.1

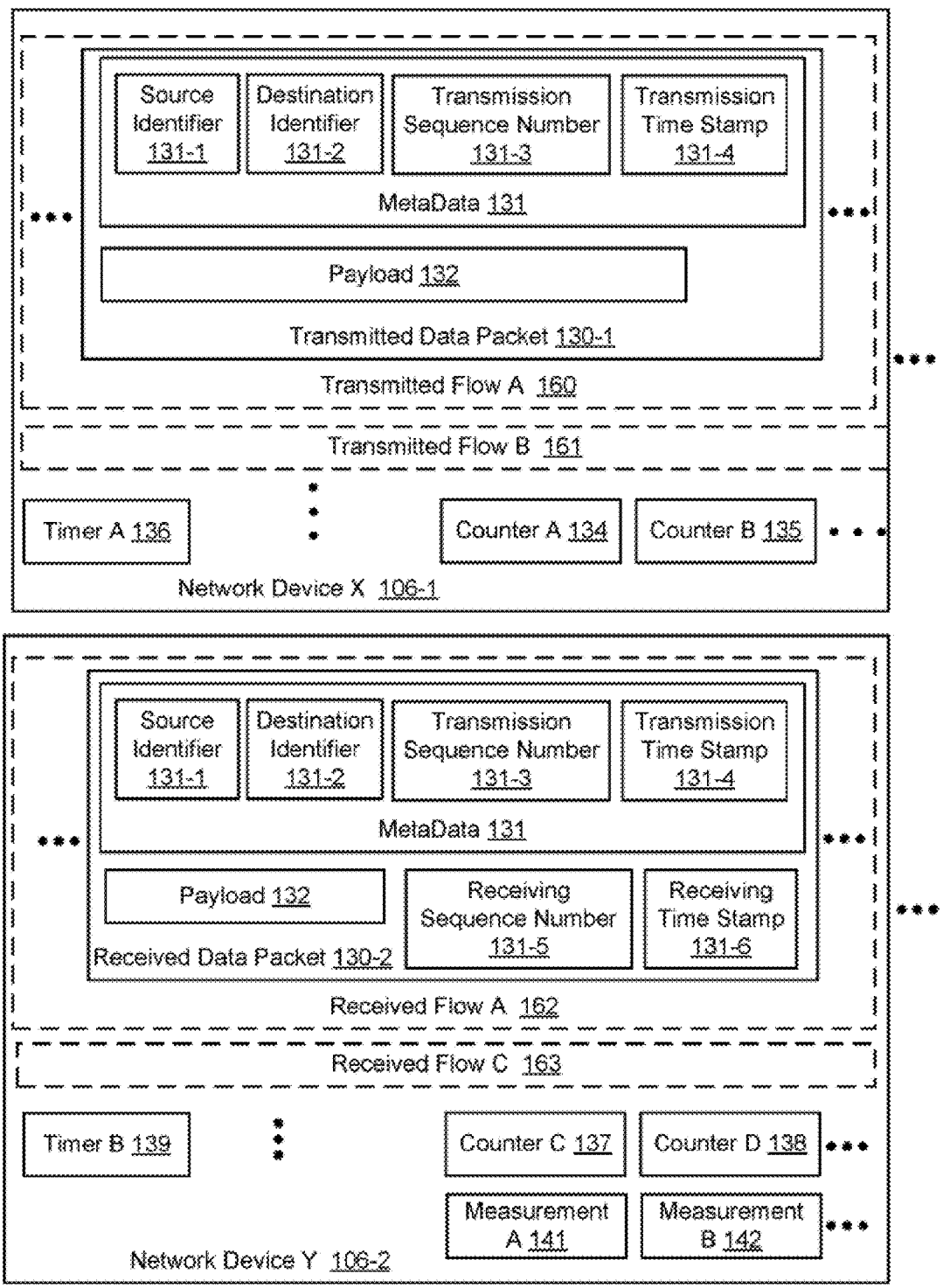
FIG. 1.2

PACKET THROUGHPUT AND LOSS RATIO MEASUREMENTS OF A SERVICE FUNCTION CHAIN

BACKGROUND

A network packet is a formatted data item that is transmitted by a network. Formatting data into packets allows for packet switching and sharing of network bandwidth among a large number of users. A packet includes control information and user data, which is also known as the payload. Control information includes metadata for delivering the payload, such as source and destination network addresses, error detection codes, etc. Typically, control information is found in packet headers and/or trailers.

A service function is a specific treatment applied to data packets by a physical or virtual network device. Examples of service function include firewall, WAN, application acceleration, deep packet inspection, lawful intercept, server load balancing, etc. A service function path is a network path traversed by data packets to receive an ordered set of service functions. A service function chain is the ordered set of service functions associated with a service function path. A network service header is a data item containing control information and included in the data packets to support the service function chain. The service function, service function path, service function chain, and network service header are described in RFC (Request for Comments) 7665, an Internet Engineering Taskforce memorandum on Internet standards and protocols.

SUMMARY

In general, in one aspect, the invention relates to a method for monitoring a network. The method includes generating a first receiving sequence number representing a first location within a first ordered sequence of a number of data packets as received by a receiving device, and extracting a first transmission sequence number representing a second location within a second ordered sequence of the number of data packets as transmitted by a transmitting device. The method further includes generating a second receiving sequence number representing a third location within the first ordered sequence of the number of data packets, extracting a second transmission sequence number representing a fourth location within the second ordered sequence of the number of data packets. The method further includes generating a measurement of network transmission based at least on the first receiving sequence number, the first transmission sequence number, the second receiving sequence number, and the second transmission sequence number.

In general, in one aspect, the invention relates to a system. The system includes a receiving device configured to generate, in response to receiving a first data packet of a number of data packets, a first receiving sequence number representing a first location within a first ordered sequence of the number of data packets as received by the receiving device, and extract, from a first metadata item of the first data packet, a first transmission sequence number representing a second location within a second ordered sequence of the number of data packets as transmitted by a transmitting device. The receiving device is further configured to generate, in response to receiving a second data packet of the number of data packets, a second receiving sequence number representing a third location within the first ordered sequence of the number of data packets as received by the receiving device, and extract, from a second metadata item of the second data packet, a second transmission sequence number representing a fourth location within the second ordered sequence of the number of data packets as transmitted by the transmitting device. The receiving device is further configured to generate a measurement of network transmission from the transmitting device to the receiving device based at least on the first receiving sequence number, the first transmission sequence number, the second receiving sequence number, and the second transmission sequence number.

In general, in one aspect, the invention relates to a non-transitory computer readable medium storing instructions for monitoring a network by a receiving device. The instructions, when executed by a computer processor, include functionality for generating, by a receiving device and in response to receiving a first data packet of a number of data packets, a first receiving sequence number representing a first location within a first ordered sequence of the number of data packets as received by the receiving device, and extracting, by the receiving device and from a first metadata item of the first data packet, a first transmission sequence number representing a second location within a second ordered sequence of the number of data packets as transmitted by a transmitting device. The instructions, when executed by a computer processor, further include functionality for generating, by the receiving device and in response to receiving a second data packet of the number of data packets, a second receiving sequence number representing a third location within the first ordered sequence of the number of data packets as received by the receiving device, and extracting, by the receiving device and from a second metadata item of the second data packet, a second transmission sequence number representing a fourth location within the second ordered sequence of the number of data packets as transmitted by the first transmitting device. The instructions, when executed by a computer processor, further include functionality for generating a measurement of network transmission from the transmitting device to the receiving device based at least on the first receiving sequence number, the first transmission sequence number, the second receiving sequence number, and the second transmission sequence number.

Other aspects of the invention will be apparent from the following description and the appended claims.

BRIEF DESCRIPTION OF DRAWINGS

FIGS. 1.1 and 1.2 show block diagrams of a system in accordance with one or more embodiments of the invention.

DETAILED DESCRIPTION

Figure 2:
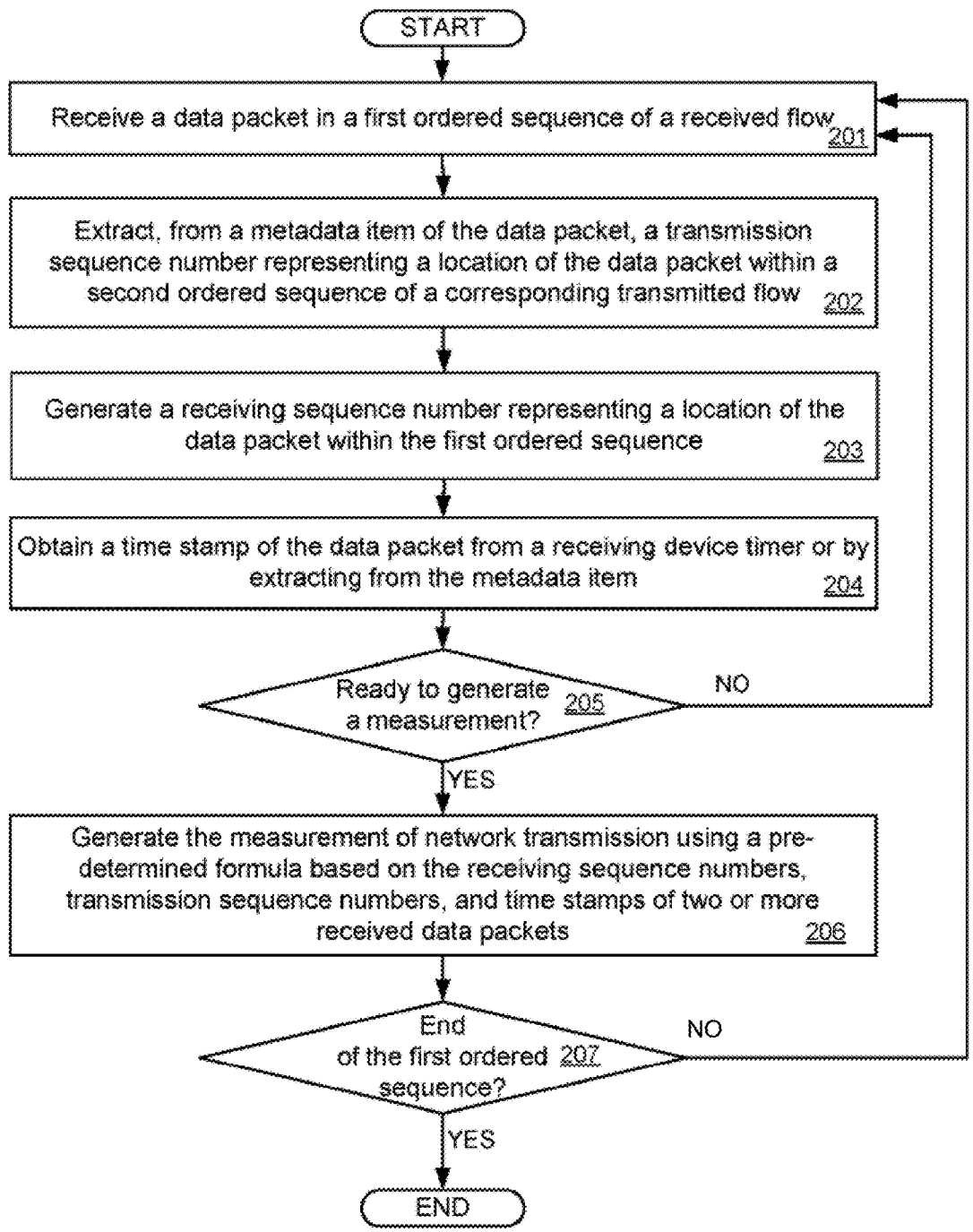
FIG. 2 shows a flowchart in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description, any component described with regard to a figure, in various embodiments of the invention, may be equivalent to one or more like-named components described with regard to any other figure. For brevity, at least a portion of these components are implicitly identified based on various legends. Further, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure. In the figures, black solid collinear dots indicate that additional components similar to the components before and/or after the solid collinear dots may optionally exist.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention provide a system, a method, and a computer readable medium for monitoring a network. In particular, measurements of network transmission are generated, such as packet throughput and loss ratio measurements. As used herein, network transmission is the transmission of data packets by the network. Further, the measurements of network transmission are generated on a per service basis. For example, the packet throughput and loss ratio measurements may be generated for individual service function chains. In one or more embodiments of the invention, the measurements are based on transmission sequence numbers and time stamps inserted by a transmitting device into service network headers of the data packets. For example, the sequence number may be based on a free running counter counting the data packets. The measurements are further based on receiving sequence numbers and time stamps generated by the receiving device in response to receiving the data packets. The transmission sequence numbers and time stamps are then compared to receiving sequence numbers and time stamps to generate a comparison result. Accordingly, packet throughput and loss ratio measurements of a service function chain are generated based on the comparison result of corresponding transmitting device and receiving device.

FIG. 1.1 shows a system (100) in accordance with one or more embodiments. In one or more embodiments, one or more of the modules and elements shown in FIG. 1.1 may be omitted, repeated, and/or substituted. Accordingly, embodiments of the invention should not be considered limited to the specific arrangements of modules shown in FIG. 1.1.

As shown in FIG. 1.1, the system (100) includes multiple client devices (e.g., client device X (102-1), client device Y (102-2), client device Z (102-3), etc.) connected by a network (150) in accordance with one or more embodiments. A network is a set of interconnected computing devices that are configured to receive and forward packets in order to transmit information from a source client device to a destination client device. In one or more embodiments of the invention, the network (150) includes one or more of a local area network (LAN), a wide area network (WAN), a telecommunication network, etc, and may include wired and/or wireless portions of the Internet.

In general, the network (150) provides network services to the client devices (e.g., client device X (102-1), client device Y (102-2), client device Z (102-3), etc.). In particular, the network services are provided by one or more service providers operating the network (150) to one or more users of the client devices. For example, one or more client devices (e.g., client device X (102-1), client device Y (102-2), client device Z (102-3), etc.) may be configured to send data over the network (150). Similarly, one or more client devices (e.g., client device X (102-1), client device Y (102-2), client device Z (102-3), etc.) may be configured to receive data over the network (150). In one or more embodiments, the network services allow the client devices (e.g., client device X (102-1), client device Y (102-2), client device Z (102-3), etc.) to send/receive data in one or more signal types including Ethernet, digital video, Synchronous Optical Networking (SONET)/Synchronous Digital Hierarchy (SDH), G.709 Optical Transport Network (OTN), and other formats/protocols that are native to the client devices.

The client devices (e.g., client device X (102-1), client device Y (102-2), client device Z (102-3), etc.) may be computing devices of any type including mobile phones, desktop or tablet personal computers (PCs) used by the users, routers, switches or servers operated by the users for accessing the network (150), or other devices operated by the users. Examples of the client devices (e.g., client device X (102-1), client device Y (102-2), client device Z (102-3), etc.) may correspond to various portions of the computing system described in reference to FIG. 4 below.

Within the network (150), the network device X (106-1), network device Y (106-2), network device Z (106-3), network device W (106-4), etc., may be computing devices of any type, including servers, routers, switches, etc., operated by one or more service providers of the network (150). Each network device (e.g., network device X (106-1), network device Y (106-2), network device Z (106-3), network device W (106-4)) may have one or more ports, which are physical and/or logical interfaces for communicating with other network devices. Examples of the network devices (e.g., network device X (106-1), network device Y (106-2), network device Z (106-3), network device W (106-4)) of the network (150) may correspond to various portions of the computing system described in reference to FIG. 4 below.

Further, a network path (e.g., network path XY (151), network path XZ (152), network path YZ (153)) is an ordered sequence of one or more network links, one or more intermediate elements, and/or any intervening devices that connect two network devices through which packets flow. A network link may be a connection between two ports residing on two separate network devices (i.e., external link) or within a single network device (i.e., internal link). In one or more embodiments, a network device may be connected to multiple network paths. For example, the network device X (106-1) is connected to the network path XY (151) and the network path XZ (152). In one or more embodiments, multiple network paths may exist between two network devices. Accordingly, packets or other telecommunication data may be exchanged between the two network devices via one or more of the network paths. In one or more embodiments, the network path XY (151) is used to provide the network services to the client device X (102-1), client device Y (102-2), and client device Z (102-3) where the network device X (106-1) and network device Y (106-2) act as the interfaces (i.e., edge network devices) to the network (150). In one or more embodiments, the network (150) includes multiple layers according to a layered network architecture, such as the seven-layer OSI model of computer networking. In such embodiments, the network paths (e.g., network path XY (151)) may include network links, intermediate elements, and/or any intervening devices that support or otherwise are associated with one or more network layers. In one or more embodiments, one or more network paths (e.g., network path XY (151), network path XZ (152), network path YZ (153)) corresponds to a service function path with associated service function chain.

A service function path is a particular network path traversed by data packets to receive an ordered set of service functions provided by particular devices along the network path. In other words, as data packets travel on a service function path, the data packets are processed according to service functions provided by each device (e.g., network devices) along the path. The ordering of the devices on the network path is the order of the service functions in the ordered set. A service function chain is the ordered set of service functions corresponding to a service function path. In other words, the service function chain is the ordered set of service functions along the service function path.

As further shown in FIG. 1.1, the network (150) includes a network management system (101) in accordance with one or more embodiments. Network management is the process of administering and managing the network (150). The network management system (101) has many functions including network service provisioning, network monitoring, fault analysis, performance management, etc. In one or more embodiments, network monitoring is performed to monitor the network (150) for detecting slow or failing elements of the network (150) and to notify the service provider(s) in case of outages or other service interruptions. In response to the notification, the network management system (101) may perform one or more network management tasks to mitigate or otherwise address the outages and service interruptions. For example, the network management tasks may include fault analysis and performance management for maintaining quality of service of the network (150).

In one or more embodiments, the network management system (101) is a dedicated device separate from the network devices (e.g., network device X (106-1), network device Y (106-2), network device Z (106-3), network device W (106-4)) that transmit information between the client devices. In one or more embodiments, at least a portion of the network management system (101) may be distributed and reside within the network devices (e.g., network device X (106-1), network device Y (106-2), network device Z (106-3), network device W (106-4)) that transmit information between the client devices.

Although FIG. 1.1 only shows three client devices (e.g., client device X (102-1), client device Y (102-2), client device Z (102-3)), four network devices (e.g., network device X (106-1), network device Y (106-2), network device Z (106-3), network device W (106-4)), and three network paths (e.g., network path XY (151), network path XZ (152), network path YZ (153)), those skilled in the art, having the benefit of this detailed description, will appreciate that the system (100) may have any number of client devices, network devices, and network paths. Further, different network paths may share one or more devices or have different devices altogether.

FIG. 1.2 shows example details of the network device X (106-1) and network device Y (106-2), depicted in FIG. 1.1 above, in accordance with one or more embodiments. In one or more embodiments of the invention, the network device X (106-1) and network device Y (106-2) correspond to a transmitting device and a receiving device, respectively, of a network path, such as a service function path associated with a service function chain. In one or more embodiments, one or more of the modules and elements shown in FIG. 1.2 may be omitted, repeated, and/or substituted. Accordingly, embodiments of the invention should not be considered limited to the specific arrangements of modules shown in FIG. 1.2.

As shown in FIG. 1.2, the network device X (106-1) is configured to transmit data flows (e.g., transmitted flow A (160), transmitted flow B (161), etc.) to various receiving devices in the network (150), as depicted in FIG. 1.1 above. The network device that transmits may be referred to as a transmitting device. The network device that receives may be referred to as a receiving device. The use of the terms "transmitting" and 'receiving" is with respect to a data flow or a network path. The network device Y (106-2) is configured to receive data flows (e.g., received flow A (162), received flow C (163), etc.) from various transmitting devices in the network (150), as depicted in FIG. 1.1 above. A data flow is a sequence of data packets sent from a transmitting device to a receiving device. In this context, the transmitting device is the source of the data flow and the receiving device is the destination of the data flow. The sequence of data packets as transmitted by the transmitting device is a transmitted flow. The sequence of data packets as received by the receiving device is a received flow. Due to noise or other conditions of the physical transmission media, one or more data packets of the transmitted flow may not arrive at and be received by the receiving device. The missing data packets result in discrepancies between the transmitted flow and the corresponding received flow.

For example, the transmitted flow A (160) may be transmitted from the network device X (106-1) to the network device Y (106-2) as the receiving device. In another example, the transmitted flow B (161) may be transmitted from the network device X (106-1) to the network device Z (106-3) as the receiving device. With the exception of any aforementioned missing data packets, the network device Y (106-2) receives the transmitted flow A (160), or a portion thereof, as the received flow A (162). Similarly, the network device Y (106-2) receives a different transmitted flow (not shown), e.g., from the network device W (106-4)), as the received flow C (163). In one or more embodiments, one or more of the transmitted flow A (160), transmitted flow B (161), received flow A (162), and received flow C (163) is transmitted via a service function path and treated by service functions of the corresponding service function chain.

Further as shown in FIG. 1.2, the transmitted flow A (160) includes a transmitted data packet (130-1) that corresponds to a received data packet (130-2) of the received flow A (162). In particular, the transmitted data packet (130-1) includes metadata (131) and payload (132) that are also included in the received data packet (130-2). The metadata (131) includes a source identifier (131-1) and a destination identifier (131-2) to facilitate data transmission in the network (150). Specifically, the source identifier (131-1) is a data item that identifies, in the network (150), the network device X (106-1) as a transmitting device. For example, the source identifier (131-1) may be an IP address of the network device X (106-1). Similarly, the destination identifier (131-2) is a data item that identifies, in the network (150), the network device Y (106-2) as a receiving device. For example, the destination identifier (131-2) may be an IP address of the network device Y (106-2). In one or more embodiments, the metadata (131) is embedded as a header or trailer to the payload (132), such as a network service header to facilitate the transmitted flow A (160) traversing a service function path.

In one or more embodiments, the network device X (106-1) is configured to insert transmission sequence numbers in the transmitted data packets such that the transmitted flow is transmitted as an ordered sequence. Specifically, each transmission sequence number specifies a unique location of the corresponding data packet in the ordered sequence. For example, the network device X (106-1) may include a counter A (134) that increments each time a transmitted data packet (e.g., transmitted data packet (130-1)) is formatted for transmission. The resultant count of the counter A (134) for the transmitted data packet (130-1) is inserted in the metadata (131) as the transmission sequence number (131-3). Accordingly, the data packet formatted for transmission immediately prior to the transmitted data packet (130-1) has a transmission sequence number that is one less than the transmission sequence number (131-3). In contrast, the data packet formatted for transmission immediately subsequent to the transmitted data packet (130-1) has a transmission sequence number that is one more than the transmission sequence number (131-3). In one or more embodiments, separate counters are used to generate transmission sequence numbers for different transmitted flows of the network device X (106-1). While the counter A (134) is used to generate transmission sequence numbers for the transmitted flow A (160), a separate and independent counter B (135) is used to generate transmission sequence numbers for the transmitted flow B (161).

Similar to inserting the transmission sequence numbers, the network device X (106-1) is further configured to insert transmission time stamps in the data packets to track the time point when each data packet is transmitted. For example, the network device X (106-1) may include a timer A (136) that is synchronized to a global timer of the network (150) and generates a time stamp each time a transmitted data packet (e.g., transmitted data packet (130-1)) is formatted for transmission. The time stamp generated for the transmitted data packet (130-1) is inserted in the metadata (131) as the transmission time stamp (131-4).

In one or more embodiments, inserting the transmission sequence numbers and transmission time stamps into the transmitted data packets (e.g., transmitted data packet (130-1)) is in response to an instruction to measure network transmission in the network (150). For example, the instruction may be sent to the network device X (106-1) from the network management system (101) depicted in FIG. 1.1 above.

In one or more embodiments, the network device Y (106-2) is configured to generate receiving sequence numbers to represent the received data packets as an ordered sequence. Specifically, each receiving sequence number specifies a unique location of the corresponding data packet in the ordered sequence. For example, the network device Y (106-2) may include a counter C (137) that increments each time a received data packet (e.g., received data packet (130-2)) is received. The resultant count of the counter C (137) for the received data packet (130-2) is assigned to the received data packet (130-2) as the receiving sequence number (131-5). Accordingly, the data packet received immediately prior to the received data packet (130-2) has a receiving sequence number that is one less than the receiving sequence number (131-5). In contrast, the data packet received immediately subsequent to the received data packet (130-2) has a receiving sequence number that is one more than the receiving sequence number (131-5). In one or more embodiments, separate counters are used to generate receiving sequence numbers for different received flows of the network device Y (106-2). While the counter C (137) is used to generate receiving sequence numbers for the received flow A (162), a separate and independent counter D (138) is used to generate receiving sequence numbers for the received flow C (163).

Similar to generating and assigning the receiving sequence numbers, the network device Y (106-2) is further configured to generate and assign time stamps for the data packets to track the time point when each data packet is received. For example, the network device Y (106-2) may include a timer B (139) that is synchronized to the global timer of the network (150) and generates a time stamp each time a received data packet (e.g., received data packet (130-2)) is received. The time stamp generated for the received data packet (130-2) is assigned to the received data packet (130-2) as the received time stamp (131-6).

In one or more embodiments, the network device Y (106-2) is further configured to generate a measurement (e.g., measurement A (141), measurement B (142)) of network transmission for one or more received flows (e.g., received flow A (162), received flow C (163), etc.). In one or more embodiments, the measurement is a numerical magnitude of one or more parameters of transmitting data packets in the network (150), such as a throughout parameter, a packet loss parameter, etc. In one or more embodiments, the network device Y (106-2) generates the measurement of network transmission using the method described in reference to FIG. 2 below. While multiple received flows (e.g., received flow A (162), received flow C (163), etc.) may overlap in time as received by the network device Y (106-2), the measurement of network transmission (e.g., measurement A (141), measurement B (142)) is generated on a per flow basis. In other words, the measurement A (141) generated for the received flow A (162) is independent of the received flow C (163). Similarly, the measurement B (142) generated for the received flow C (163) is independent of the received flow A (162).

Although the network device X (106-1) is described above as a transmitting device and the network device Y (106-2) is described above as a receiving device, the network device X (106-1) may also receive data flows as a receiving device while the network device Y (106-2) may also transmit data flows as a transmitting device.

FIG. 2 shows a flowchart in accordance with one or more embodiments. The process shown in FIG. 2 may be executed, for example, by one or more components discussed above in reference to FIGS. 1.1-1.2. One or more steps shown in FIG. 2 may be omitted, repeated, and/or performed in a different order among different embodiments of the invention. Accordingly, embodiments of the invention should not be considered limited to the specific number and arrangement of steps shown in FIG. 2.

Initially, in Step 201, a data packet of a received flow is received. In particular, the received flow includes a set of data packets being received, by a receiving device, in a first ordered sequence. In other words, the ordered sequence being received is the first ordered sequence. For example, the currently received data packet may be any data packet as received by the receiving device within the first ordered sequence. In one or more embodiments, the set of data packets corresponds to at least a portion of a transmitted flow. Specifically, the transmitted flow is being transmitted in a second ordered sequence by a transmitting device. In other words, the ordered sequence being transmitted is the second ordered sequence. For example, the currently received data packet may be any data packet already transmitted by the transmitting device within the second ordered sequence. In one or more embodiments, one or more data packets (referred to as missing data packet(s)) are lost from the transmitted flow during network transmission. In such embodiments, the first ordered sequence of the received flow is shortened from the second ordered sequence of the transmitted flow by the missing data packet(s) count.

In Step 202, a transmission sequence number is extracted from a metadata item of the data packet, such as the network service header. In one or more embodiments, the transmission sequence number is generated by the transmitting device to represent a location of the data packet within the second ordered sequence of the transmitted flow. In one or more embodiments, the transmission sequence number is periodically inserted in the metadata item as transmitted in the second ordered sequence of the transmitted flow. For example, the transmission sequence number may be inserted in the metadata item every N (e.g., 10, 100, 1000, etc.) data packets in the second ordered sequence. In one or more embodiments, the transmission sequence number is inserted in the metadata item for each data packet as transmitted throughout the second ordered sequence of the transmitted flow. In one or more embodiments, the transmission sequence number is extracted by the receiving device.

In one or more embodiments, the transmission sequence number is extracted in response to the receiving device detecting that the received flow is received via a service function path and is associated with a service function chain.

In one or more embodiments, the transmission sequence number is extracted in response to the receiving device detecting a measurement flag in the data packet that indicates whether the data packet is to be used for measurement. For example, the measurement flag may indicate whether the data packet includes the transmission sequence number in the network service header of the data packet. In other words, the measurement flag is used to prevent the receiving device from extracting the transmission sequence number for any data packet that the transmitting device has not inserted the transmission sequence number.

In one or more embodiments, the transmission sequence number is extracted in response to an instruction sent by a network management system to the receiving device to initiate network transmission measurement for the service function chain.

In Step 203, a receiving sequence number is generated that represents a location of the data packet within the first ordered sequence. In one or more embodiments, the receiving sequence number is generated by the receiving device for each data packet as received throughout the first ordered sequence of the received flow. In one or more embodiments, a difference exists between the transmission sequence number of the data packet and receiving sequence number of the data packet. For example, the difference may correspond to one or more missing data packets lost from the transmitted flow prior to receiving the data packet in Step 201.

In one or more embodiments, the receiving sequence number is generated in response to the receiving device detecting that the received flow is received via a service function path and is associated with a service function chain. In one or more embodiments, the receiving sequence number is generated in response to the instruction sent by the network management system to the receiving device to initiate network transmission measurement for the service function chain.

In Step 204, a time stamp of the data packet is obtained by the receiving device in response to receiving the data packet. In one or more embodiments, the time stamp is obtained by extracting from a metadata item of the data packet. In particular, the time stamp is previously inserted in metadata item to represent a time point of the data packet as transmitted by the transmitting device. In such embodiments, the time stamp is a transmission time stamp. In one or more embodiments, the time stamp is obtained from a timer of the receiving device to represent a time point of the data packet as received by the receiving device. In such embodiments, the time stamp is a receiving time stamp.

In one or more embodiments, the time stamp of the data packet is obtained in response to the receiving device detecting that the received flow is received via a service function path and is associated with a service function chain. In one or more embodiments, the time stamp of the data packet is obtained in response to the receiving device detecting a measurement flag in the data packet that indicates whether the data packet is to be used for measurement. For example, the measurement flag may indicate whether the data packet includes the transmission sequence number and transmission time stamp in the network service header of the data packet. In other words, the measurement flag is used to prevent the receiving device from obtaining the time stamp for any data packet that the transmitting device has not inserted the transmission sequence number and/or the transmission time stamp. In one or more embodiments, the time stamp of the data packet is obtained in response to the instruction sent by the network management system to the receiving device to initiate network transmission measurement for the service function chain.

In Step 205, a determination is made as to whether the information collected above is ready for generating a measurement of network transmission. In one or more embodiments, the determination is made based on whether two data packets for measurement (e.g., indicated by the measurement flags) have been received. In one or more embodiments, the determination is made based on whether two data packets have been received that are separated by a transmission sequence number difference, a receiving sequence number difference, and/or a time stamp difference. For example, the transmission sequence number difference may be any number less than the length of the transmitted flow, the receiving sequence number difference may be any number less than the length of the received flow, and the time stamp difference may be any number less than a pre-determined time difference. In one or more embodiments, the transmission sequence number difference, receiving sequence number difference, and/or time stamp difference are according to a pre-determined network transmission measurement criterion. In one or more embodiments, the transmission sequence number difference, receiving sequence number difference, and/or time stamp difference are specified in the instruction sent by the network management system to the receiving device to initiate network transmission measurement for a service function chain.

If the determination of Step 205 is negative, i.e., the information collected is not yet ready for generating the measurement of network transmission, the method returns to Step 201 to continue receiving remaining data packets in the first ordered sequence of the received flow. If the determination of Step 205 is positive, i.e., the information collected is ready for generating the measurement of network transmission, the method proceeds to Step 206.

In Step 206, the measurement of network transmission from the transmitting device to the receiving device is generated. In one or more embodiments, the measurement is generated using a pre-determined formula based on the receiving sequence numbers, transmission sequence numbers, and time stamps of two or more received data packets.

In one or more embodiments, generating the measurement includes (i) generating a transmission sequence number difference by comparing the transmission sequence numbers of two received data packets, (ii) generating a receiving sequence number difference by comparing the receiving sequence numbers of the two received data packets, and (iii) generating a loss packet count based on a difference between the transmission sequence number difference and the receiving sequence number difference. In such embodiments, the measurement of network transmission corresponds to a ratio of the loss packet count over the transmission sequence number difference. In one or more embodiments, the measurement represents a service traffic loss ratio of a service function chain. An example formula used for generating the service traffic loss ratio is described in reference to FIG. 3 below.

In one or more embodiments, generating the measurement includes (i) generating a time stamp difference based on the time stamps of two received data packets, and (ii) generating a loss packet count based on a difference between the transmission sequence number difference and the receiving sequence number difference. In such embodiments, the measurement of network transmission corresponds to a ratio of the loss packet count over the time stamp difference to represent a service traffic loss rate of a service function chain formed by at least the first transmitting device and the receiving device. An example formula used for generating the service traffic loss rate is described in reference to FIG. 3 below.

In one or more embodiments, the measurement of network transmission corresponds to a ratio of the receiving sequence number difference over the time stamp difference to represent a service traffic throughput of a service function chain formed by at least the first transmitting device and the receiving device. An example formula used for generating the service traffic throughput is described in reference to FIG. 3 below.

In one or more embodiments, the measurement of network transmission is provided to the network management system for monitoring and analysis. In particular, the monitoring and analysis are performed for each individual service function chain. For example, a management task of the network may be performed by the network management system if one or more of the service traffic loss ratio, service traffic loss rate, and service traffic throughput fail to meet a pre-determined criteria of the service function chain. For example, a preventive measure, network resource allocation, or other maintenance tasks may be performed to address an issue of the associated service function path.

In Step 207, a determination is made as to whether the received data packet corresponds to the end of the first ordered sequence of the received flow. For example, the determination may be based on end-of-flow status information embedded in the data packet, a time-out condition of receiving the data packet, or other pre-determined end-of-flow criterion. If the determination is negative, i.e., the received data packet does not correspond to the end of the first ordered sequence of the received flow, the method returns to Step 201 to continue receiving remaining data packets in the first ordered sequence of the received flow. In particular, the receiving device continue to process the data packets of the received flow. If the determination is positive, i.e., the received data packet corresponds to the end of the first ordered sequence of the received flow, the method ends.

Figure 3:
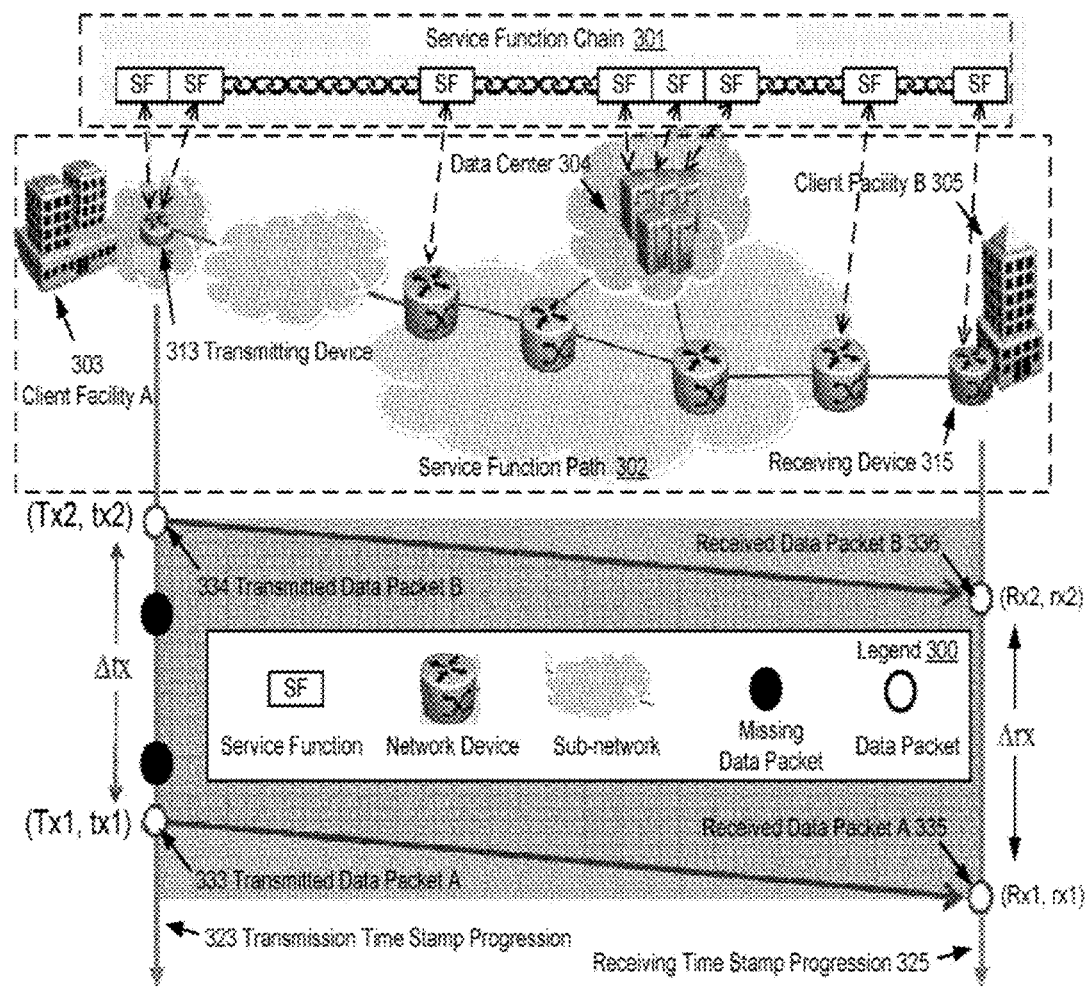
FIG. 3 shows an example in accordance with one or more embodiments of the invention.

FIG. 3 shows an example, according to the legend (300), in accordance with one or more embodiments of the invention. The example shown in FIG. 3 may be, for example, based on one or more components depicted in FIGS. 1.1-1.2 above and the method flowchart depicted in FIG. 2 above. In one or more embodiments, one or more of the modules and elements shown in FIG. 3 may be omitted, repeated, and/or substituted. Accordingly, embodiments of the invention should not be considered limited to the specific arrangements of modules shown in FIG. 3.

As shown in FIG. 3, the service function path (302) includes a transmitting device (313), a receiving device (315), a data center (304), and intervening network devices collectively providing a service function chain (301) for client devices in the client facility A (303) and client facility B (305). Service traffic are shown as data packets along the transmission time stamp progression (323) and the receiving time stamp progression (325). Specifically, the transmitted data packet A (333) precedes the transmitted data packet B (334) in an ordered sequence of a transmitted flow along the transmission time stamp progression (323). Correspondingly, the received data packet A (335) precedes the received data packet B (336) in an ordered sequence of a received flow along the receiving time stamp progression (325). In other words, the transmitted data packet A (333) is transmitted by the transmitting device (313) and received as the received data packet A (335) by the receiving device (315). Similarly, the transmitted data packet B (334) is transmitted by the transmitting device (313) and received as the received data packet B (336) by the receiving device (315).

NSH (network service header) is the SFC (service function chain) encapsulation to support the SFC Architecture. NSH is a data-plane header/protocol that represents a service function path in the network. NSH may be used to decouple the service layer from the network transport. The data packet containing the NSH is referred to as a service packet. The transmitted flow and received flow associated with a SFC is referred to as a service flow. The example shown in FIG. 3 leverages the NSH to provide support for throughput and loss performance measurements for a service flow within the SFC. A supplemental context header is appended or otherwise added to the NSH to facilitate such performance measurements. The supplemental context header contains the count of the service packets already transmitted at the time of transmitting the service packet associated with the NSH. For example, the count may be generated by a free running counter that increments every time a service packet is transmitted. The supplemental context header may also contain the time of transmit, i.e., the transmission time stamp. Although the transmission sequence number is generated for each and every service packet in the service flow, the supplemental context header may not be included in the NSH for each and every service packet in the service flow. For example, the service packet(s) containing the supplemental context header may be identified using the aforementioned measurement flag. Further, the percentage of service packets in the service flow that include the supplemental context header may vary.

As shown in FIG. 3, the supplemental context header of the transmitted data packet A (333) includes the transmission sequence number and transmission time stamp pair (Tx1, tx1). Similarly, the supplemental context header of the transmitted data packet B (334) includes the transmission sequence number and transmission time stamp pair (Tx2, tx2). As the transmitted data packet A (333) and transmitted data packet B (334) are received by the receiving device (315), the corresponding received data packet A (335) and received data packet B (336) are assigned respective receiving sequence number and receiving time stamp pairs (Rx1, rx1) and (Rx2,rx2).

In one or more embodiments, the service traffic loss rate (STLRate) is generated using Eq. 1 or Eq. 2 below.

$$STLRate = (|Tx2 - Tx1| - |Rx2 - Rx1|)/|tx2 - tx1| \qquad Eq.1$$

$$STLRate = (|Tx2 - Tx1| - |Rx2 - Rx1|)/|rx2 - rx1| \qquad Eq.2$$

In one or more embodiments, the service traffic loss ratio (STLRatio) is generated using Eq. 3 or Eq. 4 below.

$$STLRatio = (|Tx2 - Tx1| - |Rx2 - Rx1|)/|Tx2 - Tx1| \qquad Eq.3$$

$$STLRatio = (|Tx2 - Tx1| - |Rx2 - Rx1|)/|Rx2 - Rx1| \qquad Eq.4$$

In one or more embodiments, the service traffic throughput (STTP) is generated using Eq. 5 or Eq. 6 below.

$$STTP = |Rx2 - Rx1|/|tx2 - tx1| \qquad Eq.5$$

$$STTP = |Rx2 - Rx1|/|rx2 - rx1| \qquad Eq.6$$

One or more of the measurements STLRate, STLRatio, and STTP may be generated between any two network devices within a service function path. The two network devices act as the transmitting device and receiving device for a portion of the service function path (referred to as a service function path segment). The frequency at which the transmission sequence number is inserted by the transmitting device of the service function path segment may vary within the transmitted flow. The periodically inserted transmission sequence numbers are used by the receiving device of the service function path segment to generate the STLRate, STLRatio, and/or STTP. The generated measurements are provided to the network management system to mitigate or otherwise address outages and service interruptions of the service function chain. The network management system may advantageously aggregate the STLRate, STLRatio, and/or STTP of multiple service function chains to perform fault analysis and performance management for maintaining overall quality of service of the network.

Figure 4:
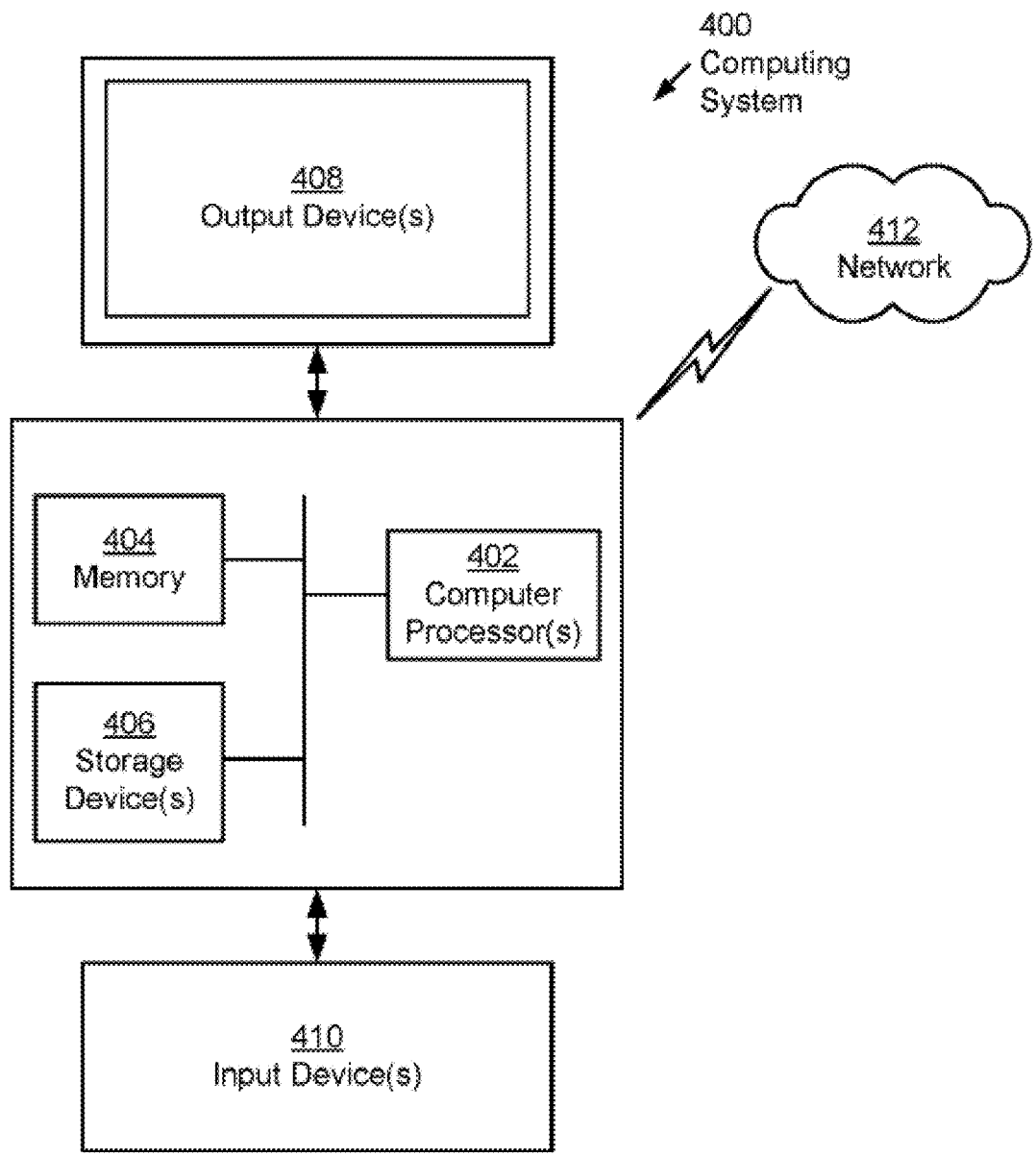
FIG. 4 shows a computing system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device. The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for monitoring a network, comprising:
generating, by a receiving device of a service function chain which is an ordered set of service functions in a path and in response to receiving a first data packet of a first plurality of data packets, a first receiving sequence number representing a first location within a first ordered sequence of the first plurality of data packets as received by the receiving device;
extracting, by the receiving device and from a first metadata item of the first data packet, a first transmission sequence number representing a second location within a second ordered sequence of the first plurality of data packets as transmitted by a first transmitting device;

generating, by the receiving device and in response to receiving a second data packet of the first plurality of data packets, a second receiving sequence number representing a third location within the first ordered sequence of the first plurality of data packets as received by the receiving device;

extracting, by the receiving device and from a second metadata item of the second data packet, a second transmission sequence number representing a fourth location within the second ordered sequence of the first plurality of data packets as transmitted by the first transmitting device; and generating a measurement of network transmission from the first transmitting device to the receiving device based at least on the first receiving sequence number, the first transmission sequence number, the second receiving sequence number, and the second transmission sequence number, wherein the first transmission sequence number and the second transmission sequence number are extracted from a network service header of the first data packet and the second data packet, respectively, the network service header is for the service function chain.

2. The method of claim 1, wherein the generating the measurement of network transmission comprises:

generating a transmission sequence number difference based on the first transmission sequence number and the second transmission sequence number;

generating a receiving sequence number difference based on the first receiving sequence number and the second receiving sequence number; and generating a loss packet count based on a difference between the transmission sequence number difference and the receiving sequence number difference, wherein the measurement of network transmission corresponds to a ratio of the loss packet count over the transmission sequence number difference to represent a service traffic loss ratio of a service function chain formed by at least the first transmitting device and the receiving device.

3. The method of claim 1, further comprising:

obtaining, by the receiving device and in response to receiving the first data packet, a first time stamp of the first data packet;

obtaining, by the receiving device and in response to receiving the second data packet, a second time stamp of the second data packet; and generating the measurement of network transmission further based on the first time stamp and the second time stamp.

4. The method of claim 3, wherein the first time stamp represents a first time point of the first data packet as received by the receiving device within the first ordered sequence, and wherein the second time stamp represents a second time point of the second data packet as received by the receiving device within the first ordered sequence.

5. The method of claim 3, wherein the generating the measurement of network transmission comprises:

generating a time stamp difference based on the first time stamp and the second time stamp; and generating a loss packet count based on a difference between the transmission sequence number difference and the receiving sequence number difference, wherein the measurement of network transmission corresponds to a ratio of the loss packet count over the time stamp difference to represent a service traffic loss rate of a service function chain formed by at least the first transmitting device and the receiving device.

6. The method of claim 3, wherein the measurement of network transmission corresponds to a ratio of the receiving sequence number difference over the time stamp difference to represent a service traffic throughput of a service function chain formed by at least the first transmitting device and the receiving device.

7. The method of claim 3, wherein the obtaining the first time stamp and the second time stamp comprises:

extracting, by the receiving device from a network service header of the first data packet, the first time stamp that represents a first time point of the first data packet as transmitted by the first transmitting device within the second ordered sequence, and extracting, by the receiving device from the network service header of the second data packet, the second time stamp that represents a second time point of the second data packet as transmitted by the first transmitting device within the second ordered sequence.

8. The method of claim 1, further comprising:

further generating the measurement of network transmission from a second transmitting device to the receiving device based on a second plurality of data packets transmitted by a second transmitting device, wherein the first plurality of data packets and the second plurality of data packets overlap in time as received by the receiving device, wherein the measurement of network transmission from the first transmitting device to the receiving device is independent of the second plurality of data packets, and wherein the measurement of network transmission from the second transmitting device to the receiving device is independent of the first plurality of data packets.

9. A system, comprising:

a receiving device of a service function chain which is an ordered set of service functions in a path, wherein the receiving device is configured to:

generate, in response to receiving a first data packet of a first plurality of data packets, a first receiving sequence number representing a first location within a first ordered sequence of the first plurality of data packets as received by the receiving device;

extract, from a first metadata item of the first data packet, a first transmission sequence number representing a second location within a second ordered sequence of the first plurality of data packets as transmitted by a first transmitting device;

generate, in response to receiving a second data packet of the first plurality of data packets, a second receiving sequence number representing a third location within the first ordered sequence of the first plurality of data packets as received by the receiving device;

extract, from a second metadata item of the second data packet, a second transmission sequence number representing a fourth location within the second ordered sequence of the first plurality of data packets as transmitted by the first transmitting device; and generate a measurement of network transmission from the first transmitting device to the receiving device based at least on the first receiving sequence number, the first transmission sequence number, the second receiving sequence number, and the second transmission sequence number, wherein the first transmission sequence number and the second transmission sequence number are extracted from a network service header of the first data packet and the second data packet, respectively, the network service header is for the service function chain.

10. The system of claim 9, wherein the generating the measurement of network transmission comprises:
generating a transmission sequence number difference based on the first transmission sequence number and the second transmission sequence number;
generating a receiving sequence number difference based on the first receiving sequence number and the second receiving sequence number; and
generating a loss packet count based on a difference between the transmission sequence number difference and the receiving sequence number difference,
wherein the measurement of network transmission corresponds to a ratio of the loss packet count over the transmission sequence number difference to represent a service traffic loss ratio of a service function chain formed by at least the first transmitting device and the receiving device.

11. The system of claim 9, the receiving device further configured to:
obtain, in response to receiving the first data packet, a first time stamp of the first data packet;
obtain, in response to receiving the second data packet, a second time stamp of the second data packet; and
generate the measurement of network transmission further based on the first time stamp and the second time stamp.

12. The system of claim 11,
wherein the first time stamp represents a first time point of the first data packet as received by the receiving device within the first ordered sequence, and
wherein the second time stamp represents a second time point of the second data packet as received by the receiving device within the first ordered sequence.

13. The system of claim 11, wherein the generating the measurement of network transmission comprises:
generating a time stamp difference based on the first time stamp and the second time stamp; and
generating a loss packet count based on a difference between the transmission sequence number difference and the receiving sequence number difference,
wherein the measurement of network transmission corresponds to a ratio of the loss packet count over the time stamp difference to represent a service traffic loss rate of a service function chain formed by at least the first transmitting device and the receiving device.

14. The system of claim 11,
wherein the measurement of network transmission corresponds to a ratio of the receiving sequence number difference over the time stamp difference to represent a service traffic throughput of a service function chain formed by at least the first transmitting device and the receiving device.

15. The system of claim 11, wherein the obtaining the first time stamp and the second time stamp comprises:
extracting, from a network service header of the first data packet, the first time stamp that represents a first time point of the first data packet as transmitted by the first transmitting device within the second ordered sequence, and
extracting, from the network service header of the second data packet, the second time stamp that represents a second time point of the second data packet as transmitted by the first transmitting device within the second ordered sequence.

16. The system of claim 9, further comprising:
a first transmitting device configured to:
receive an instruction to measure network transmission in the network;
insert, in the first data packet and in response to the instruction, the first transmission sequence number;
insert, in a second data packet and in response to the instruction, the second transmission sequence number; and
transmit, to the receiving device, at least the first plurality of data packets according to the first ordered sequence; and
a second transmitting device configured to:
transmit, to the receiving device, at least a second plurality of data packets, wherein the receiving device is further configured to:
receive the second plurality of data packets that overlap in time with respect to receiving the first plurality of data packets; and
generate the measurement of network transmission from the second transmitting device to the receiving device based on the second plurality of data packets,
wherein the measurement of network transmission from the first transmitting device to the receiving device is independent of the second plurality of data packets, and
wherein the measurement of network transmission from the second transmitting device to the receiving device is independent of the first plurality of data packets.

17. A non-transitory computer readable medium storing instructions for monitoring a network by a receiving device, the instructions, when executed by a computer processor, comprising functionality for:
generating, in response to receiving a first data packet of a first plurality of data packets associated with a service function chain which is an ordered set of service functions in a path, a first receiving sequence number representing a first location within a first ordered sequence of the first plurality of data packets as received by the receiving device;
extracting, from a first metadata item of the first data packet, a first transmission sequence number representing a second location within a second ordered sequence of the first plurality of data packets as transmitted by a first transmitting device;
generating, in response to receiving a second data packet of the first plurality of data packets, a second receiving sequence number representing a third location within the first ordered sequence of the first plurality of data packets as received by the receiving device;
extracting, from a second metadata item of the second data packet, a second transmission sequence number representing a fourth location within the second ordered sequence of the first plurality of data packets as transmitted by the first transmitting device; and
generating a measurement of network transmission from the first transmitting device to the receiving device based at least on the first receiving sequence number, the first transmission sequence number, the second receiving sequence number, and the second transmission sequence number,
wherein the first transmission sequence number and the second transmission sequence number are extracted from a network service header of the first data packet and the second data packet, respectively, the network service header is for the service function chain.

18. The non-transitory computer readable medium of claim 17, wherein the generating the measurement of network transmission comprises:
  generating a transmission sequence number difference based on the first transmission sequence number and the second transmission sequence number;
  generating a receiving sequence number difference based on the first receiving sequence number and the second receiving sequence number; and
  generating a loss packet count based on a difference between the transmission sequence number difference and the receiving sequence number difference,
  wherein the measurement of network transmission corresponds to a ratio of the loss packet count over the transmission sequence number difference to represent a service traffic loss ratio of a service function chain formed by at least the first transmitting device and the receiving device.

19. The non-transitory computer readable medium of claim 17, the instructions, when executed by the computer processor, further comprising functionality for:
  obtaining, in response to receiving the first data packet, a first time stamp of the first data packet;
  obtaining, in response to receiving the second data packet, a second time stamp of the second data packet;
  generating a time stamp difference based on the first time stamp and the second time stamp; and generating a loss packet count based on a difference between the transmission sequence number difference and the receiving sequence number difference,
  wherein the measurement of network transmission corresponds to a ratio of the loss packet count over the time stamp difference to represent a service traffic loss rate of a service function chain formed by at least the first transmitting device and the receiving device.

20. The non-transitory computer readable medium of claim 17, the instructions, when executed by the computer processor, further comprising functionality for:
  obtaining, in response to receiving the first data packet, a first time stamp of the first data packet; and
  obtaining, in response to receiving the second data packet, a second time stamp of the second data packet,
  wherein the measurement of network transmission corresponds to a ratio of the receiving sequence number difference over the time stamp difference to represent a service traffic throughput of a service function chain formed by at least the first transmitting device and the receiving device.

* * * * *